(12) United States Patent
McDonald et al.

(10) Patent No.: US 6,600,298 B2
(45) Date of Patent: Jul. 29, 2003

(54) SWITCHING DC-DC CONVERTER WITH THE OUTPUT VOLTAGE CHANGING INVERSELY TO ANY CHANGE IN THE CONVERTER INDUCTOR CURRENT

(75) Inventors: Brent A. McDonald, Round Rock, TX (US); John J. Breen, Harker Heights, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 10/002,658

(22) Filed: Oct. 31, 2001

(65) Prior Publication Data

US 2003/0080718 A1 May 1, 2003

(51) Int. Cl.$^7$ .................................................. G05F 1/59
(52) U.S. Cl. ....................................... 323/271; 323/285
(58) Field of Search ................................ 323/271, 282, 323/285

(56) References Cited

U.S. PATENT DOCUMENTS

| | | | | |
|---|---|---|---|---|
| 5,600,234 A | * | 2/1997 | Hastings et al. | 323/282 |
| 5,912,552 A | * | 6/1999 | Tateishi | 323/285 |
| 5,955,872 A | * | 9/1999 | Grimm | 323/271 |
| 5,994,885 A | * | 11/1999 | Wilcox et al. | 323/285 |
| 6,028,755 A | * | 2/2000 | Saeki et al. | 323/285 |
| 6,064,187 A | * | 5/2000 | Redl et al. | 323/285 |
| 6,229,292 B1 | * | 5/2001 | Redl et al. | 323/285 |
| 6,288,524 B1 | * | 9/2001 | Tsujimoto | 323/282 |
| 6,366,070 B1 | * | 4/2002 | Cooke et al. | 323/285 |
| 6,396,252 B1 | * | 5/2002 | Culpepper et al. | 323/285 |

OTHER PUBLICATIONS

Maxim MAX1718, Notebook CPU Step–Down Controller for Intel Mobile Voltage Positioning (IMVP–II), 19–1960, Rev. 0; 2/01, published by Maxim Integrated Products, 120 San Gabriel Drive, Sunnyvale, California 94086; 35 pages.
Intel Application Note AP–587, Slot 1 Processor Power Distribution Guidelines; Order No.: 243332–001, May 1997, 31 pages.
Pressman, Abraham I., "Switching Power Supply Design", Second Edition, published by McGraw Hill, ISDN 0–07–052236–7; 1998; 11 pages.

* cited by examiner

*Primary Examiner*—Jeffrey Sterrett
(74) *Attorney, Agent, or Firm*—Haynes and Boone, L.L.P.

(57) ABSTRACT

In a DC-DC converter, a technique for sensing current supplied to a load and establishing an output voltage that conforms to a predetermined load line. The current carried by an inductor is sensed and used to control the duty cycle of the voltage applied to the inductor, thereby controlling the output voltage. A current sensing circuit includes a feedback network. A pole attributable to the feedback network cancels a zero attributable to the inductor so that a control voltage is developed that varies substantially linearly with the load current.

7 Claims, 6 Drawing Sheets

SWITCHING DC-DC CONVERTER WITH THE OUTPUT VOLTAGE CHANGING INVERSELY TO ANY CHANGE IN THE CONVERTER INDUCTOR CURRENT

BACKGROUND

The present disclosure relates to the field of DC power supplies. More specifically, the present disclosure relates to a technique for sensing current flowing through an inductor of a switching DC-DC power supply in order to control the output voltage as a function of load current.

DESCRIPTION OF THE RELATED ART

Computer systems are information handling systems that can be designed to give independent computing power to one user or a plurality of users. Computer systems may be found in many forms including, for example, mainframes, minicomputers, workstations, servers, personal computers, Internet terminals, notebooks, and embedded systems. Personal computer (PC) systems, such as the International Business Machines (IBM) compatible PC systems, include desktop, floor standing, or portable versions. A typical computer system is a microcomputer that includes a system processor or microprocessor, associated memory and control logic, and a number of peripheral devices that provide input and output for the system. Such peripheral devices often include display monitors, keyboards, mouse-type input devices, floppy and hard disk drives, optical drives, and printers. The number of devices being added to computer systems continues to grow. For example, many computer systems also include network capability, terminal devices, modems, sound devices, voice recognition devices, electronic pen devices, and mass storage devices such as tape drives, CD-ROM drives, or DVDs.

Typically, computer systems are powered by a power supply system that receives and converts alternating current (AC) power to direct current (DC) power that is used to power the computer system components such as the system processor. In one type of AC-DC power supply used to supply current at DC voltages, power is converted from an AC power source, such as 120 V, 60 Hz or 220 V, 50 Hz power, from a wall outlet. This is accomplished by first rectifying the AC voltage of the power source to an unregulated DC voltage. The unregulated DC voltage typically has a ripple waveform component. To "smooth" the ripple component, most power supplies incorporate a bulk filter capacitor or bulk reservoir capacitor. Typically, a bulk filter capacitor stores charge during the ripple peaks and releases charge during the low portion of the ripple cycle. In addition, AC-DC power supplies may typically include a DC-DC converter for providing DC power to the computer system within specified tolerances.

Typical switching DC-DC power supplies incorporate a switching circuit, a controller circuit, resistors, and diodes, in combination with a single-stage LC filter. The typical switching regulator power supply uses a fast operating switch, e.g., a transistor, to switch a DC input voltage through to the output at an adjustable duty cycle. Largely by varying the duty cycle, the average DC voltage delivered to the output could be controlled. Such average voltage consisted of rectangular voltage pulses of adjustable width whose average value was the required DC output voltage. One example of a switching DC-DC converter circuit is a Buck regulator or converter. The Buck regulator circuit is described in further detail in a reference book "Switching Power Supply Design", Abraham I. Pressman, Second Edition, published by McGraw Hill, ISDN 0-07-052236-7. The output of the Buck circuit may be either a step-down voltage or a boosted voltage.

Advances in processor technology have consistently driven down the supply voltages required to operate processors, thereby reducing power consumption. The supply voltage for processors, which is presently in the +1.0 V to +2.5 V range, may soon extend below 1.0 V. The newer processors, such as Intel's Pentium class of processors, typically specify a profile or load line that defines the relationship between the processor supply voltage and the current drawn by the processor. For example, Application Note AP-587, "Slot 1 Processor Power Distribution Guidelines", August 1998, Order Number: 243332-002, published by Intel Corporation describes the power requirements. Typically, the load line is substantially linear and has a negative slope. For example, the higher the voltage, the lower the current drawn, and lower the voltage, the higher the current drawn. Efficient generation of voltages in the +1.0 V range can be a challenge especially when the power supply system is required to produce current outputs of 10 amperes or more.

To measure current passing through the inductor included in the switching DC-DC converter, traditional methods and systems have relied on using a sense resistor connected in series with the inductor. The sense resistor, in this configuration, carries a current substantially equal to the load current. When the load is a processor, the current consumed by the processor is thus substantially equal to the current flowing through the inductor and the sense resistor. One example of a DC-DC switching power supply which uses a controller and a current sensing resistor is the Maxim MAX1718 controller from Maxim Integrated Products, Sunnyvale, Calif. However, a sense resistor continually dissipates power during the normal operation of the power supply, resulting in wasted energy that appears as heat in the power supply.

What is needed is a DC-DC switching power supply, enabled to control the output voltage as defined by a predetermined load line, preferably without a separate current sensing resistor to sense the current flowing through the inductor. Eliminating the need for a current sensing resistor also accomplishes an objective of using a minimal number of components.

SUMMARY

In accordance with the present disclosure, a method and circuit thereof for sensing current supplied to a load and establishing an output voltage that conforms to a predetermined load line in a DC-DC converter is described.

In one embodiment, a DC-DC converter circuit includes a DC-voltage input node enabled to receive the DC-voltage signal as an input, an output node enabled to provide an output voltage that varies in response to a load current, an inductor coupled between the output node and an intermediate node, a first switch coupled between the DC-voltage input node and the intermediate node, a current sense circuit having an input coupled to the inductor and a current sense output that varies substantially linearly in response to a current flowing through the inductor and a controller circuit that includes a first controller input coupled to the current sense output, a second controller input coupled to the output node, and at least one controller output for providing the control signal to the first switch. The first switch is operable to vary a duty cycle of a voltage applied to the intermediate node in response to the control signal. Specifically, the control signal causes the duty cycle to vary so that the output voltage varies in response to the current flowing through the inductor.

In this embodiment, the current sense circuit includes an amplifier circuit. The amplifier includes a first input coupled to a first end of the inductor and a second input coupled to a second end of the inductor. The amplifier also includes a feedback network coupled between an output of the amplifier and the first input of the amplifier. The transfer function of the current sense circuit is designed to have a zero attributable to inductor and a pole attributable to the feedback network.

In another embodiment, the DC-DC converter may include means coupled to the inductance for providing a control signal that varies substantially linearly with respect to the load current. The converter circuit may also include means for applying to the control signal to the switch so that the duty cycle of the switch, and the magnitude of the DC output voltage, are determined by the control signal.

In one embodiment, a method of sensing current through an inductor of a DC-DC converter enabled to control an output voltage of the DC-DC converter includes measuring the current through the inductor by measuring, a voltage signal across the inductor. In this embodiment, the voltage signal is linearly proportional to the current through the inductor. The output voltage of the DC-DC converter is also measured. The duty cycle of the DC-DC converter circuit is adjusted to vary the measured output voltage. The adjustment is made in response to the measured current flowing through the inductor and the measured output voltage. The adjusted output voltage varies in response to the current flowing through the inductor.

In another embodiment, a method of controlling a DC output voltage at an output node of a DC-DC converter having an input node, an output node and an intermediate node includes sensing a current flowing through an inductor that is coupled between the intermediate node and the output node so as to develop a current sense signal. A control signal is developed in response to the current sense signal and in response to the DC output voltage at the output node. The duty cycle of a voltage applied to the intermediate node is varied so that the DC output voltage varies in response to the current flowing through the inductor.

In one embodiment, the method of controlling an output voltage or sensing current flowing through the inductor, described above, may be implemented in a computer system. The computer system includes a processor, a memory coupled to the processor, and a power supply system for providing power to the processor. The power supply system includes a switching DC-DC converter circuit. In this embodiment, the switching DC-DC converter circuit includes a DC-voltage input, a DC-voltage output that varies in response to a load current, a switch, a current sense circuit and a controller circuit.

In this embodiment, the switch includes a switch input, a switch output and a control signal input, wherein the switch input is coupled to the DC-voltage input node and the switch output is coupled to an inductor. The control signal determines duty cycle of a signal applied to the inductor, the inductor being coupled between the switch output and the DC-voltage output. The current sense circuit includes a current sense input coupled to the inductor to detect a current through the inductor and a current sense output that varies substantially linearly with the current sense input. The controller circuit includes a first controller input coupled to the current sense output, a second controller input coupled to the DC-voltage output, and at least one controller output for providing the control signal to the switch. The control signal provided by the controller circuit causes the duty cycle to vary the DC-voltage output, in response to the current flowing through the inductor.

BRIEF DESCRIPTION OF THE DRAWINGS

The present disclosure may be better understood, and its numerous objects, features and advantages made apparent to those skilled in the art by referencing the accompanying drawings. The use of the same reference number throughout the several figures designates a like or similar element.

DETAILED DESCRIPTION

The following description of the disclosure is intended to be illustrative only and not limiting.

Figure 1:
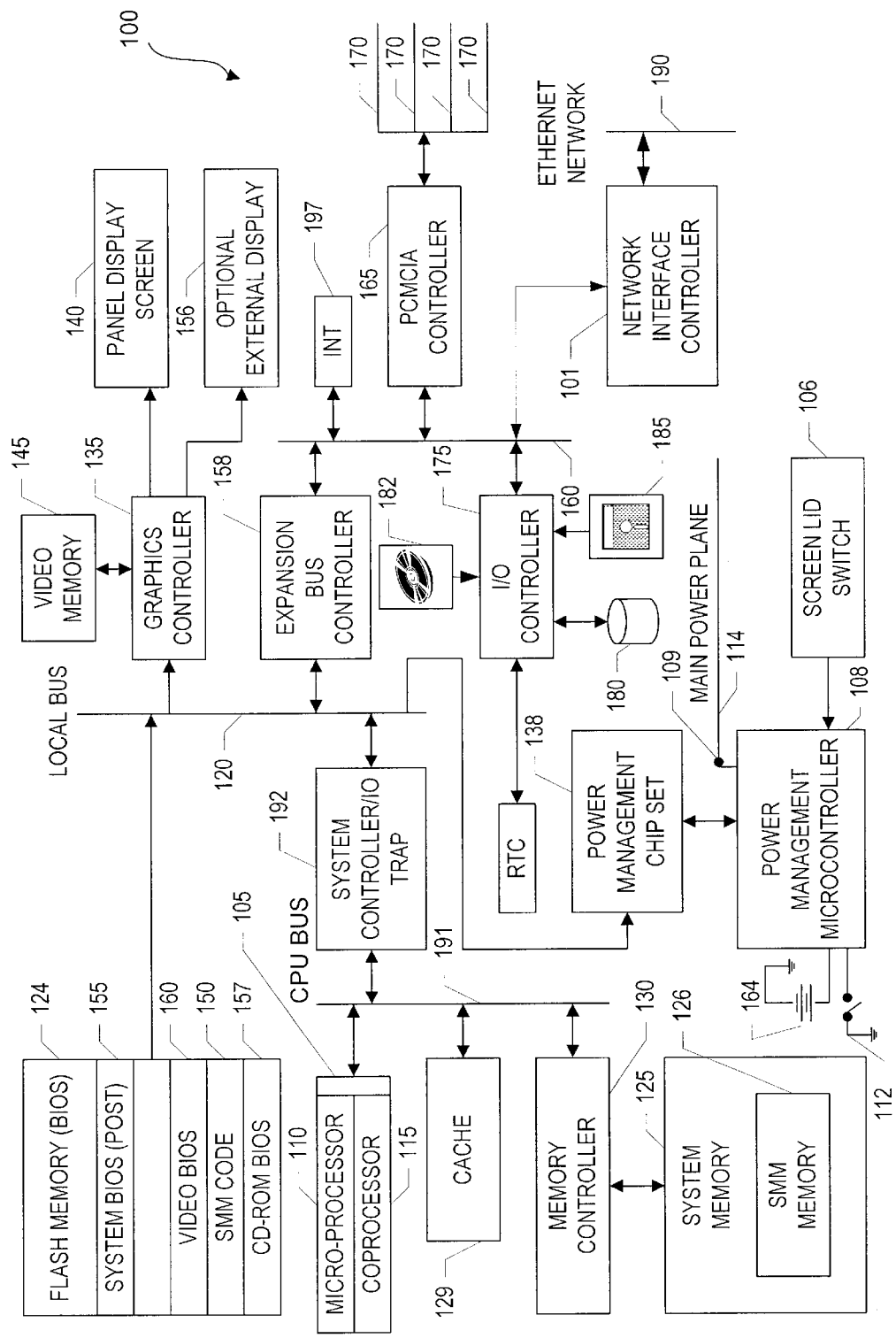
FIG. 1 illustrates a computer system, which includes a circuit to sense current flowing through an inductor of a switching DC-DC power supply that operates to control the output voltage of the power supply, as a function of the current supplied to the load.

Referring to FIG. 1, a computer system 100 is shown that includes a circuit to sense current flowing through an inductor of a switching DC-DC power supply that operates to control the output voltage of the power supply, as a function of the current supplied to the load. The computer system 100 includes a processor ("processor") 105, for example, an Intel Pentium™ class microprocessor or an AMD Athlon™ class microprocessor, having a microprocessor 110 for handling integer operations and a coprocessor 115 for handling floating point operations. Processor 105 is coupled to cache 129 and memory controller 130 via processor bus 191. System controller I/O trap 192 couples processor bus 191 to local bus 120 and is generally characterized as part of a system controller such as a Pico Power Vesuvious or an Intel™ Mobile Triton chip set. System controller I/O trap 192 can be programmed in a well known manner to intercept a particular target address or address range, and, upon intercepting a target address, system controller I/O trap 192 asserts an intercept signal indicating that processor 105 attempted to access the target address.

A main memory 125 of dynamic random access memory ("DRAM") modules is coupled to local bus 120 by a memory controller 130. Main memory 125 includes a system management mode ("SMM") memory area. A Basic Input Output System ("BIOS") memory 124 is coupled to local bus 120. A FLASH memory or other nonvolatile memory is used as BIOS memory 124. A BIOS program (not shown) is usually stored in the BIOS memory 124. The BIOS program includes CD-ROM BIOS 157 software for interaction with the computer system boot devices such as the CD-ROM 182. The BIOS memory 124 stores the system code, which controls some computer system 100 operations.

A graphics controller 135 is coupled to local bus 120 and to a panel display screen 140. Graphics controller 135 is also coupled to a video memory 145, which stores information to be displayed on panel display 140. Panel display 140 is typically an active matrix or passive matrix liquid crystal display ("LCD"), although other display technologies may be used as well. Graphics controller 135 can also be coupled to an optional external display or standalone monitor display. One graphics controller that can be employed as graphics controller 135 is the Western Digital WD90C14A graphics controller.

A bus interface controller or expansion bus controller 158 couples local bus 120 to an expansion bus 160. In a particular embodiment, expansion bus 160 is an Industry Standard Architecture ("ISA") bus, although other buses, for example, a Peripheral Component Interconnect ("PCI") bus, may also be used. A personal computer memory card international association ("PCMCIA") controller 165 is also coupled to expansion bus 160 as shown. PCMCIA controller 165 is coupled to a plurality of expansion slots 170 to receive PCMCIA expansion cards such as modems, fax cards, communications cards, and other input/output devices. Interrupt request generator 197 is also coupled to ISA bus 160 and issues an interrupt service request over a predetermined interrupt request line after receiving a request to issue interrupt instruction from processor 105.

An I/O controller 175, often referred to as a super I/O controller, is coupled to ISA bus 160. I/O controller 175 interfaces to an integrated drive electronics ("IDE") hard drive 180, a CD-ROM drive 182 and a floppy drive 185. A network interface controller 101 enables the computer system 100 to communicate with a computer network such as an Ethernet 190. The computer network may include a network such as a local area network ("LAN"), wide area network ("WAN"), Internet, Intranet, wireless broadband or the like. The network interface controller 101 forms a network interface for communicating with other computer systems (not shown) connected to the Ethernet 190 for implementing a method of enabling removal of a removable medium of a boot device included in the computer system 100 that is connected to the network of other computer systems. The computer system's networking components generally include hardware as well as software components. Examples of the hardware components include the network interface controller 101 and the Ethernet 190. Examples of the software components, which include messaging services and network administration services, are described below.

The computer system 100 serves as a controller for resolving proprietary and standard event and message structures into a common format for use by the computer network for many management purposes. The computer system 100 is connected with a plurality of computer systems in the network for receiving messages from the computer systems, analyzing the messages and determine an effective utilization of the messages as directed by a user or network administrator. The computer system 100 receives messages in different message formats, organizes the messages, and converts the messages into a common format that assists a user, system administrator, or network administrator in utilizing the information contained in the messages. The converted messages in a common format are distributed at the discretion of a user, network administrator, or system administrator based on user needs or message importance to other system administration applications via a selected communication method. The network administrator controls the type of messages that are communicated over the network. The computer system 100 supports the conversion of messages into the common format to facilitate particular network applications.

Computer system 100 includes a power supply 164, which includes various types of power supplies for converting power from AC-to-DC and/or DC-to-DC. The power supplies may be housed within the computer system 100 enclosure or may be housed external to the computer system 100 enclosure. In one embodiment, the power supply 164 includes a switching DC-DC converter circuit enabled to sense current flowing through an inductor and also enabled to control the output voltage of the power supply in response to the current flowing through the inductor.

When the computer system 100 is a laptop or notebook computer, for example, power supply 164 may be a rechargeable battery, such as a nickel metal hydride ("NiMH") or lithium ion battery. Power supply 164 is coupled to a power management microcontroller 108 that controls the distribution of power from power supply 164. More specifically, microcontroller 108 includes a power output 109 coupled to the main power plane 114 that supplies power to processor 105. Power microcontroller 108 is also coupled to a power plane (not shown) which supplies power to panel display 140. In a particular embodiment, power control microcontroller 108 is a Motorola 6805 microcontroller. Microcontroller 108 monitors the charge level of power supply 164 to determine when to charge and when not to charge battery 164. Microcontroller 108 is coupled to a main power switch 111 which the user actuates to turn the computer system 100 on and off. While microcontroller 108 powers down other portions of computer system 100, such as hard drive 180, when not in use to conserve power, microcontroller 108 itself is always coupled to a source of energy, namely power supply 164.

In a portable embodiment, computer system 100 also includes a screen lid switch or indicator, 106 that provides one indication when panel display 140 is in the open position and another indication when panel display 140 is in the closed position. It is noted that panel display 140 is generally located in the same location in the lid of the computer as is typical for "clamshell" types of portable computers such as laptop or notebook computers. In this manner, the display screen forms an integral part of the lid of the computer, which swings from an open position for interaction with the user to a close position.

Computer system 100 also includes a power management chip set 138, which may include, for example, power management chip model PT86C511 manufactured by Pico Power. Power management chip set 138 is coupled to processor 105 via local bus 120 so that power management chip set 138 can receive power control commands from processor 105. Power management chip set 138 is connected to a plurality of individual power planes that supply power to respective devices in computer system 100 such as hard drive 180 and floppy drive 185, for example. In this manner, power management chip set 138 acts under the direction of processor 105 to control the power to the various power planes and devices of the computer. A real time clock ("RTC") 140 is coupled to I/O controller 175 and power management chip set 138 such that time events or alarms can be transmitted to power management chip set 138. Real time clock 140 can be programmed to generate an alarm signal at a predetermined time.

When computer system 100 is turned on or powered up, the computer system 100 enters a start up phase, also referred to as a boot up phase, during which the computer system hardware is detected and the operating system is loaded. In case of a computer system 100 with the Windows NT® operating system, the boot up process is typically divided into three stages. The initial two boot stages pertain to start up of the system components of the computer system 100 and the third stage typically pertains to the boot up of networking components of the computer system 100.

During the initial two boot stages, the computer system BIOS software stored in non-volatile BIOS memory 124 is copied into main memory 125 so that it can be executed more quickly. This technique is referred to as "shadowing" or "shadow RAM" as discussed above. At this time, system management mode code 150 is copied into the system management mode memory area 126 of main memory 125. Processor 105 executes SMM code 150 after processor 105 receives a system management interrupt ("SMI") that causes the microprocessor to enter SMM. Additional conditions under which an SMI is generated will be discussed subsequently. It is noted that along with SMM code 150, also stored in BIOS memory 124 and copied into main memory 125 at power up are system BIOS 155 including a power on self test module ("P.O.S.T."), CD-ROM BIOS 157 and video BIOS 160. It will be recognized by those of ordinary skill in the art that other memory mapping schemes may be used. For example, SMM code 150 may be stored in fast SRAM memory (not shown) coupled to the local/processor bus 120.

Figure 2:
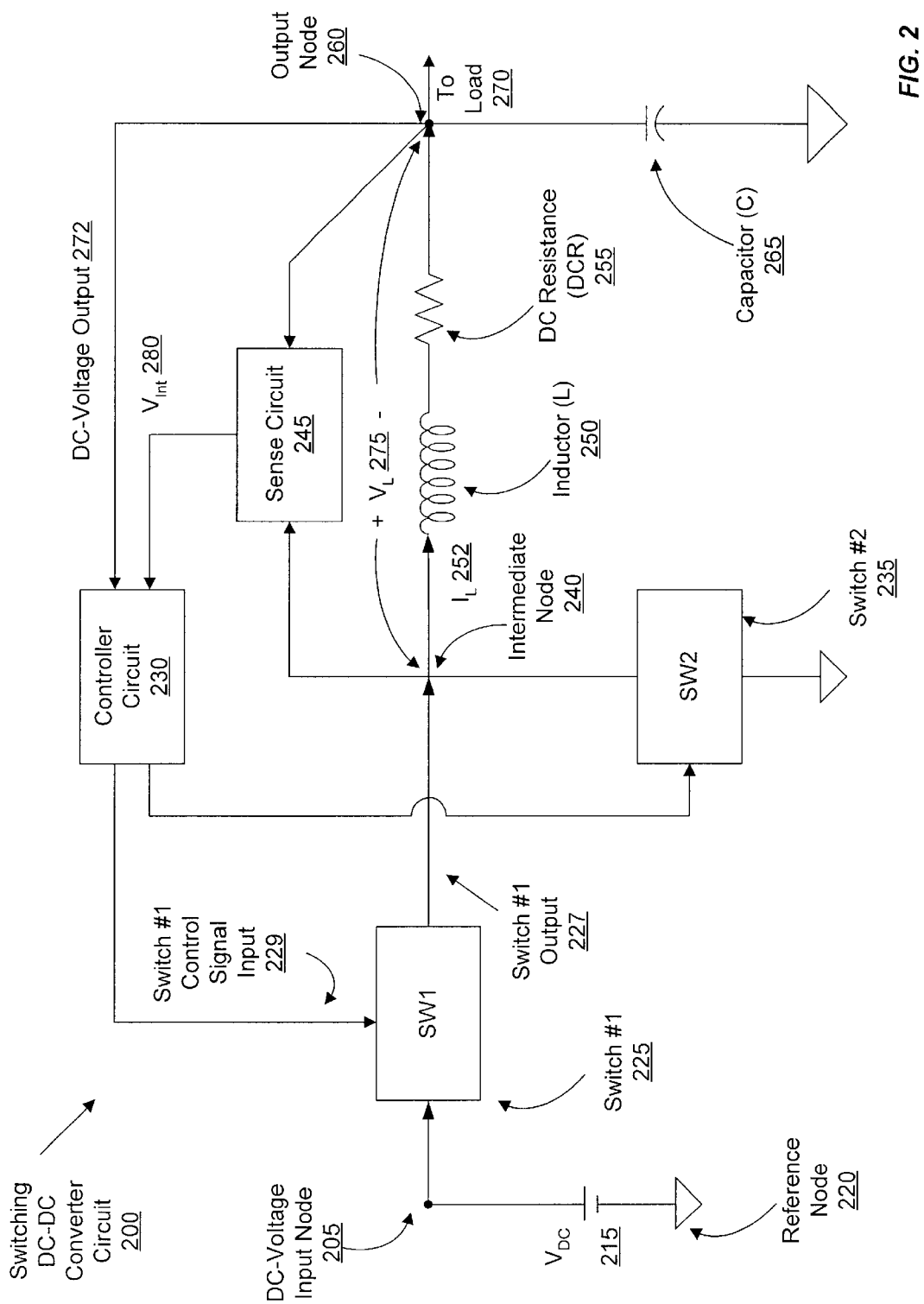
FIG. 2 shows a block diagram to sense current flowing through an inductor of a switching DC-DC power supply enabled to control the output voltage of the power supply.

Referring to FIG. 2, an illustrative block diagram of a switching DC-DC converter circuit 200, in accordance with one aspect of the invention, is shown. An input DC voltage signal, e.g., a $V_{DC}$ 215 signal, is coupled between a DC-voltage input node 205 and a reference node 220. The reference node 220 is typically at ground potential. A switch SW1 225 is coupled to the DC-voltage input node 210 and an intermediate node 240. The switch SW1 225 operates to alternatively connect or disconnect the DC input voltage signal to or from node 240, and is controllable by a control signal 229. On asserting a control signal 229, a switch SW1 225 may be configured to be in an on or an off position. A waveform with period T may be applied as a control signal 229 enabled to control the switch SW1 225. The period T includes $T_{ON}+T_{OFF}$, where $T_{ON}$ represents the time period the switch SW1 225 is on and $T_{OFF}$ represents the time period the switch SW1 225 is off. A duty cycle of the waveform is defined as $T_{ON}/(T_{ON}+T_{OFF})$. The frequency "f" of the waveform is by definition equal to 1/T. In a manner that will be described below, the duty cycle determines the magnitude of the DC output voltage 272 that appears at output node 260. Examples of a switch SW1 225 include semiconductor devices such as a transistor or a MOSFET.

A second switch SW2 235 couples the intermediate node 240 to the ground, providing a return current path for inductor L 250 when switch SW1 225 is in an off position. In one embodiment the second switch SW2 235 is complementary to the operation of the switch SW1 225. For example, when switch SW1 225 is turned on, the second switch SW2 235 is turned off, and vice versa. The second switch SW2 235, which may be similar to switch SW1 225, may include semiconductor devices such as a transistor or a MOSFET. In another embodiment, the second switch SW2 235 is implemented by using a diode, e.g., a breakdown diode.

Figure 3:
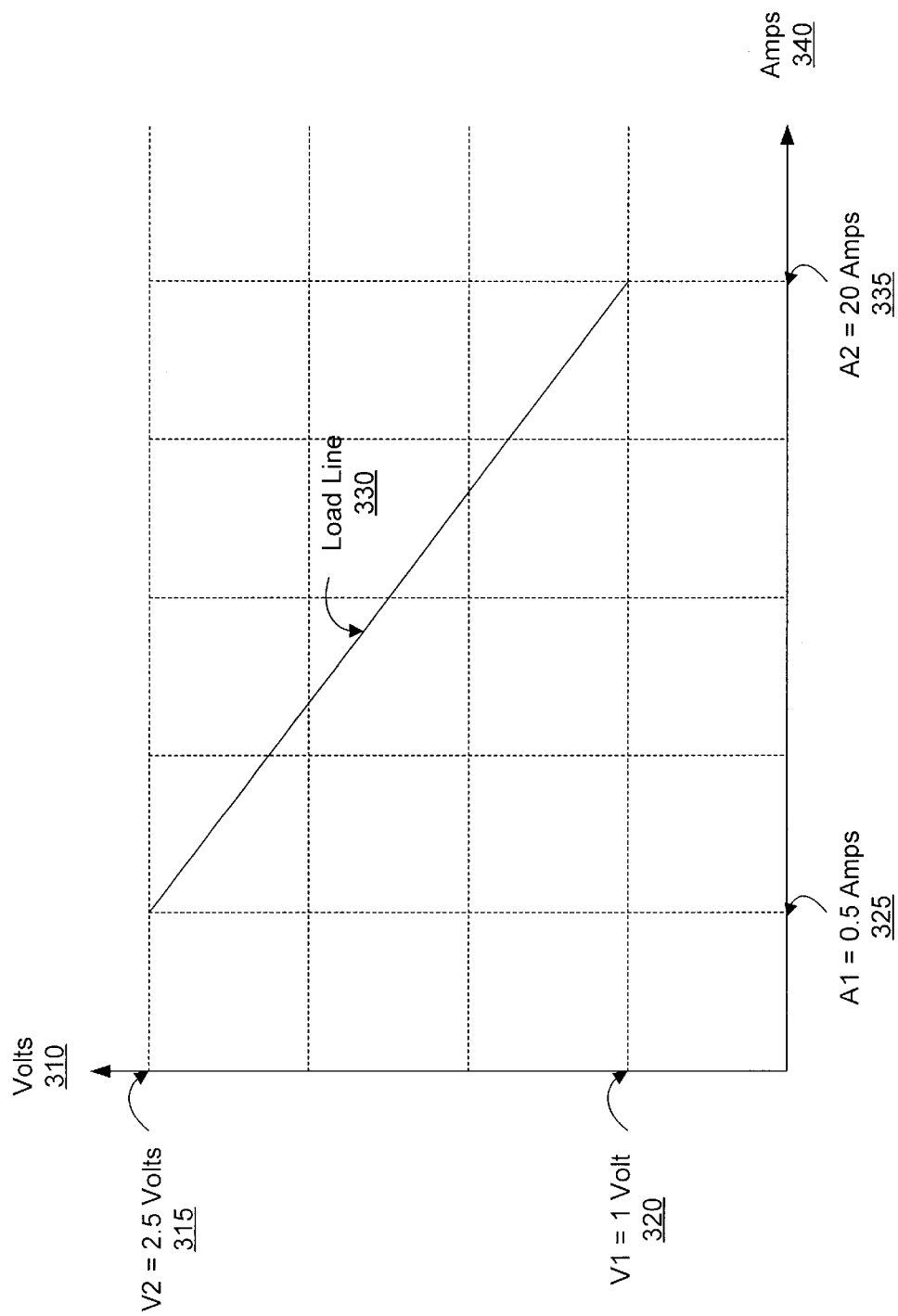
FIG. 3 shows a typical load line associated with a particular processor.

The switching DC-DC converter circuit 200 includes an output node 260 for providing an output voltage 272 and a load current to a load 270 (not shown). As described earlier, the load current is substantially equal to $I_L$ 252. The load typically includes devices, circuits and subsystems and may include a processor 105. The load line associated with a particular processor typically defines the output voltage 272 for a certain amount of current drawn from the DC-DC converter circuit 200. The output voltage 272 is typically inversely linearly proportional to the current drawn $I_L$ 252. For example, referring to FIG. 3, a typical load line 330 associated with a particular processor is illustrated. When the particular processor is drawing A1 amperes 325, the corresponding output voltage 272 required by the processor is V2 volts 315. Similarly, when the particular processor draws A2 amperes 335, the corresponding output voltage 272 required by the processor is V1 volts 320, where V1<V2, and A1<A2, and where, for a specific processor, A1=0.5 amps, A2=20 amps, V1=2.5 volts and V2=1 volt.

The switching DC-DC converter circuit 200 includes an inductor (L) element 250 coupled between the output node 260 and the intermediate node 240 and a capacitor (C) element coupled between the output node 260 and the reference node 220. A Buck converter circuit or a Buck regulator circuit is typically used to implement a switching DC-DC converter circuit. The Buck regulator typically includes a LC circuit. The capacitor (C) element 265 is typically included to improve the transient response of the circuit.

The inductor element 250 typically includes inductor windings made of a conducting material such as copper. The inductor element thus has a built-in or intrinsic resistance and is represented by a DC resistor (DCR) element 255, connected in series with the inductor 250. In accordance with the subject invention, DCR 255 is advantageously used to sense or measure the current flowing through the inductor 250, and thereby eliminate the need to use a separate discrete sense resistor.

A current sense circuit 245 is coupled to the inductor 250 to sense a voltage $V_L$ 275 across the combination (DCR 255+L 250) element. Typically the current flowing through the inductor $I_L$ 252 varies non-linearly with the voltage $V_L$ 275 across the inductor. The current sense circuit 245 advantageously provides a current sense output $V_{Int}$ 280 that varies substantially linearly in response to the current $I_L$ 252 flowing through the inductor 250. In one embodiment, a substantially linear relationship between $V_L$ 275 and the current $I_L$ 252 flowing through the inductor 250 is established by using a pole/zero cancellation technique, as described below. The current sense output $V_{Int}$ 280 is provided to a controller circuit 230 as an input to vary the duty cycle of SW1 225 and thereby adjust the output voltage 272.

The controller circuit 230 includes a first controller input coupled to the current sense output $V_{Int}$ 280 described above. The first controller input may also be referred to as a set-point input to the controller circuit 230. The controller circuit 230 includes a second controller input coupled to the output node 260 to receive the DC output voltage 272. The second controller input may also be referred to as a process variable or a measured input to the controller circuit 230. The controller circuit 230 also includes at least one controller output for providing the control signal 229 to the switch SW1 225.

The controller circuit 230 receives the $V_{Int}$ 280 signal which represents the current $I_L$ 252 flowing through the inductor 250. Based on the applicable load line 330, the controller circuit 230 determines a corresponding output voltage required for the proper operation of the load, e.g., processor 105. The measured DC output voltage 272 is compared by the controller circuit 230 to the corresponding output voltage defined by the load line 330, e.g., voltage V2 315 corresponding to current A1 325. The controller circuit 230 output, e.g., control signal 229, is used to adjust the duty cycle to make the output voltage 272 substantially equal to the corresponding output voltage defined by the load line 330.

Specifically, the control signal input 229 varies the $T_{ON}$ period, which causes the duty cycle to vary the output voltage 272. For example, if the controller circuit 230 determines that the measured DC output voltage 272 is lower than the corresponding output voltage defined by the load line, then the $T_{ON}$ period is increased resulting in DC output voltage 272 being substantially equal to the corresponding output voltage defined by the load line 330. The control cycle repeats when the current $I_L$ 252 through the inductor L 250 changes. Thus, the controller circuit 230 dynamically adjusts the output voltage 272 in response to the current $I_L$ 252 flowing through the inductor. If the load draws more current $I_L$ 252, the controller 230 decreases the voltage output 272 to a level defined by the load line 330. If the load draws less current $I_L$ 252, the controller 230 increases the voltage output 272 to a level defined by the load line 330. In one embodiment, the controller circuit 230 is implemented by using a Maxim MAX1718 controller from Maxim Integrated Products, Sunnyvale, Calif. The current sense output $V_{Int}$ 280 may be used to represent the feedback signal ("FB") for pin 4 on the Maxim MAX1718 controller device.

Figure 4:
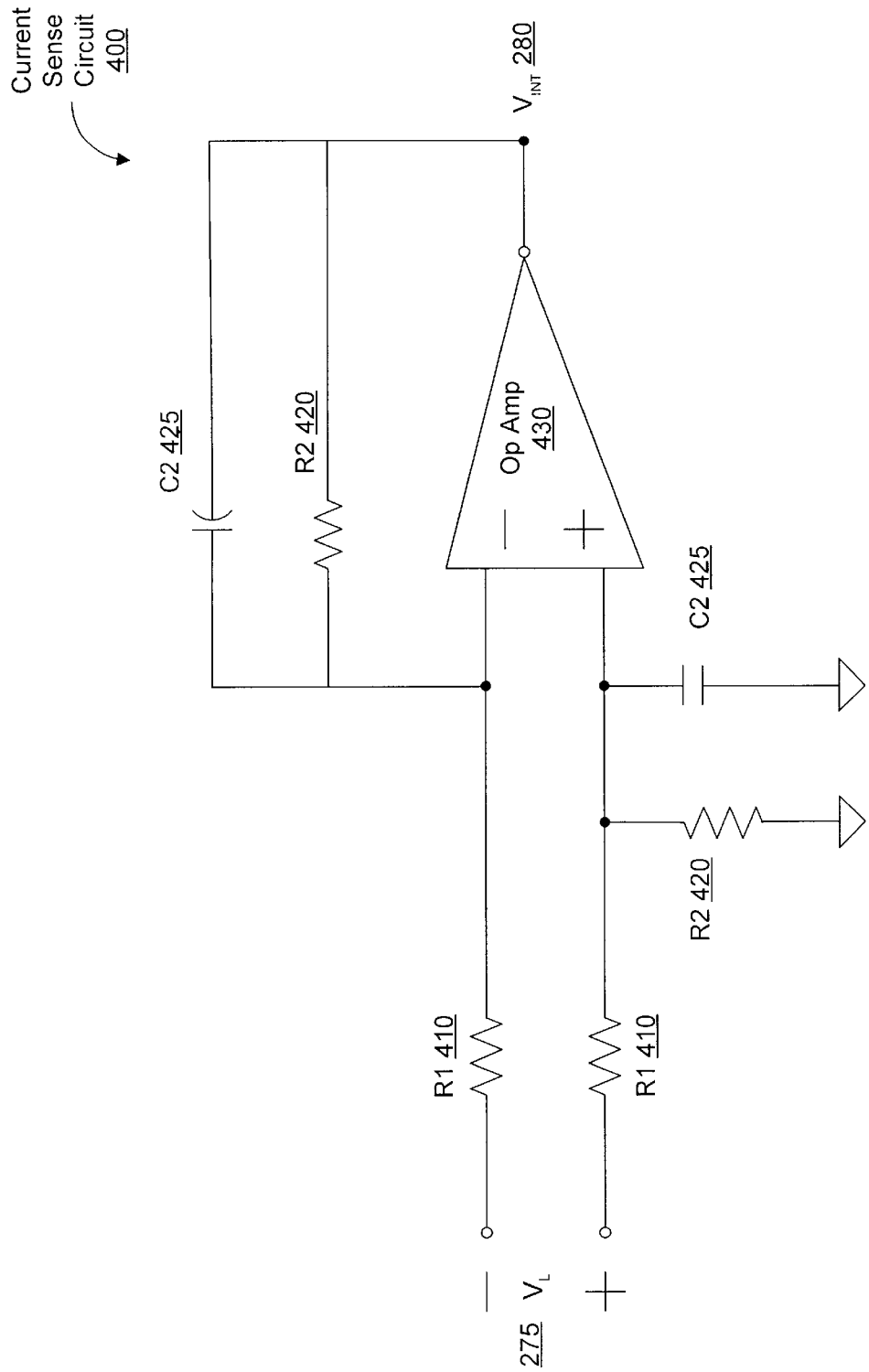
FIG. 4 shows a schematic diagram of a sense circuit flow to measure the current flowing through the inductor.

Referring to FIG. 4, a schematic current sense circuit 300 diagram for a sense circuit 245 block of FIG. 2. The DCR 255 and L 250 of the inductor form a zero in the frequency domain. The current sense circuit 400 includes an operational amplifier 430 (Op Amp), R1 410, R2 420, and C2 425. The input of the current sense circuit 400 is used to differentially sense the voltage $V_L$ 275 across the inductor 250. The output of the current sense circuit 400, e.g., $V_{Int}$ 280, is substantially linearly proportional to the current $I_L$ 252 flowing through the inductor 250. In one embodiment, the $V_{Int}$ 280 output of the current sense circuit 400 is enabled to be substantially linearly proportional to the current $I_L$ 252 flowing through the inductor by using a pole/zero cancellation technique, e.g., by locating a pole at the same location as the L/DCR zero.

The transfer function for the Op Amp RC current sensing circuit 400 is:

$V_{Int}=V_L*(R2//Z_{C2})/R1$ where $R2//Z_{C2}=R2*Z_{C2}/(R2+Z_{C2})$ and $Z_{C2}=1/(sC2)$.

Simplifying the transfer function further:

$V_{Int}(s)=V_L(s)*R2/R1*1/(s*R2*C2+1)$  Equation 300

Since $V_L$ is equal to current times impedance, $V_L=I_L*(Z_L+DCR)$  Equation 310

Substituting for $V_L$ in equation 300, $V_{Int}(s)=I_L(s)*R2/R1*DCR*((s*L/DCR)+1)/(s*R2*C2+1)$  Equation 320

Thus by making the numerator and the denominator of equation 320 equal, the zero caused by the L/DCR component exactly cancels the pole created by R2*C2. The numerator of equation 320 is made equal to the denominator when:

$L/DCR=R2*C2$  Equation 330

If L/DCR=R2*C2, the equation 320 is written as:

$V_{Int}(s)=I_L(s)R2/R1*DCR$  Equation 340

Thus the voltage $V_{Int}$ 280 across the inductor 250 is directly and linearly proportional to the current $I_L$ 252 flowing through the inductor L 250.

In one embodiment, a set of component values, which implement the pole/zero cancellation technique in the current sense circuit described above are as follows:

L=1.0 μH, DCR=1.0 mΩ;
R1=1 kΩ, R2=4 kΩ, C2=0.25 μF; and
Op Amp Gain=1E5.

By using the pole/zero cancellation technique the output of Op Amp 430 will be proportional to the inductor current $I_L$ 252. This technique advantageously eliminates the need for using an additional loss element, e.g., a current sense resistor. Also, the AC components of the inductor current waveform are advantageously reproduced unlike measuring average voltage across the inductor. Furthermore, the pole/zero cancellation technique advantageously uses a low pass filter to strip off any high frequency spikes unlike MOSFET current sensing techniques, which are susceptible to noise due to the rapid rate of change in the inductor current.

Figure 5:
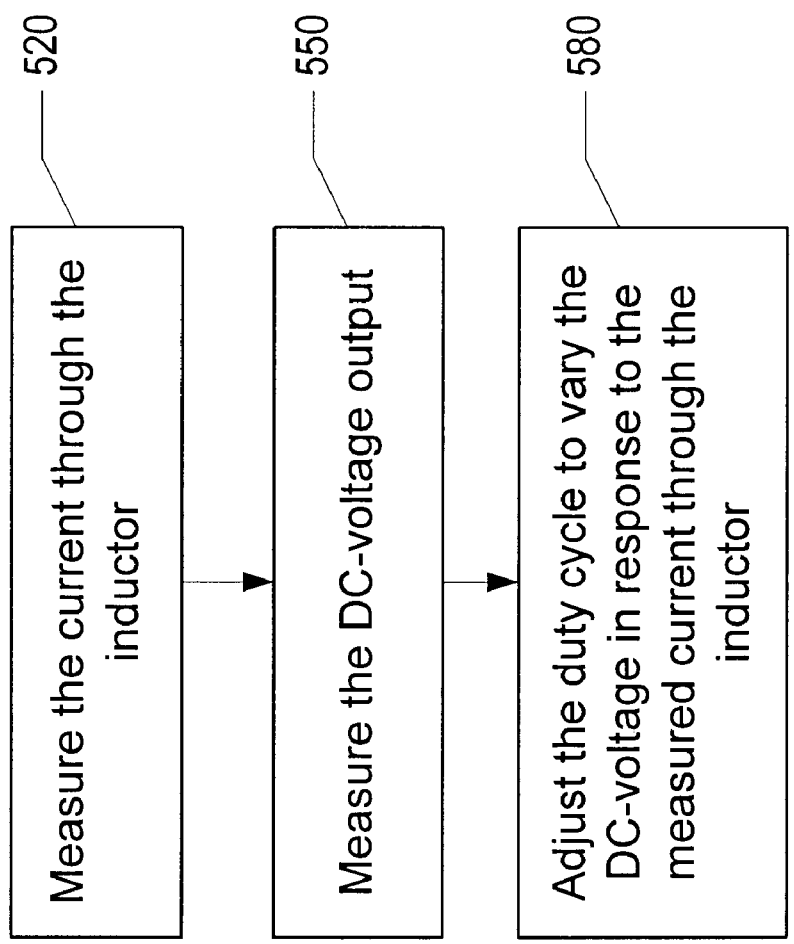
FIGS. 5 and 6 each illustrate a flow chart for various embodiments of a method of sensing current through the inductor of a DC-DC converter to control an output voltage of the DC-DC converter.

Referring to FIG. 5, one embodiment of a flow chart of a method of sensing current through an inductor of a DC-DC converter enabled to control an output voltage of the DC-DC converter is illustrated. In step 520, the current $I_L$ 252 through the inductor 250 is measured by measuring a voltage signal $V_L$ 275 across the inductor 250. In one embodiment, a sense circuit 245 is used to receive the measured voltage signal $V_L$ 275 across the inductor 250. By using pole/zero cancellation techniques described in FIG. 4, the voltage signal $V_L$ 275 is linearly proportional to the current $I_L$ 252 through the inductor 250. In step 550, the output voltage 272 of the DC-DC converter circuit 200 is measured. In step 580, an adjustment to a duty cycle of the DC-DC converter circuit 200 is made to vary the output voltage 272 to a defined output voltage. The defined output voltage for a measured value of the current $I_L$ 252 through the inductor 250 is defined by a voltage/current load line 330. The voltage/current load line may be configurable for each load.

Figure 6:
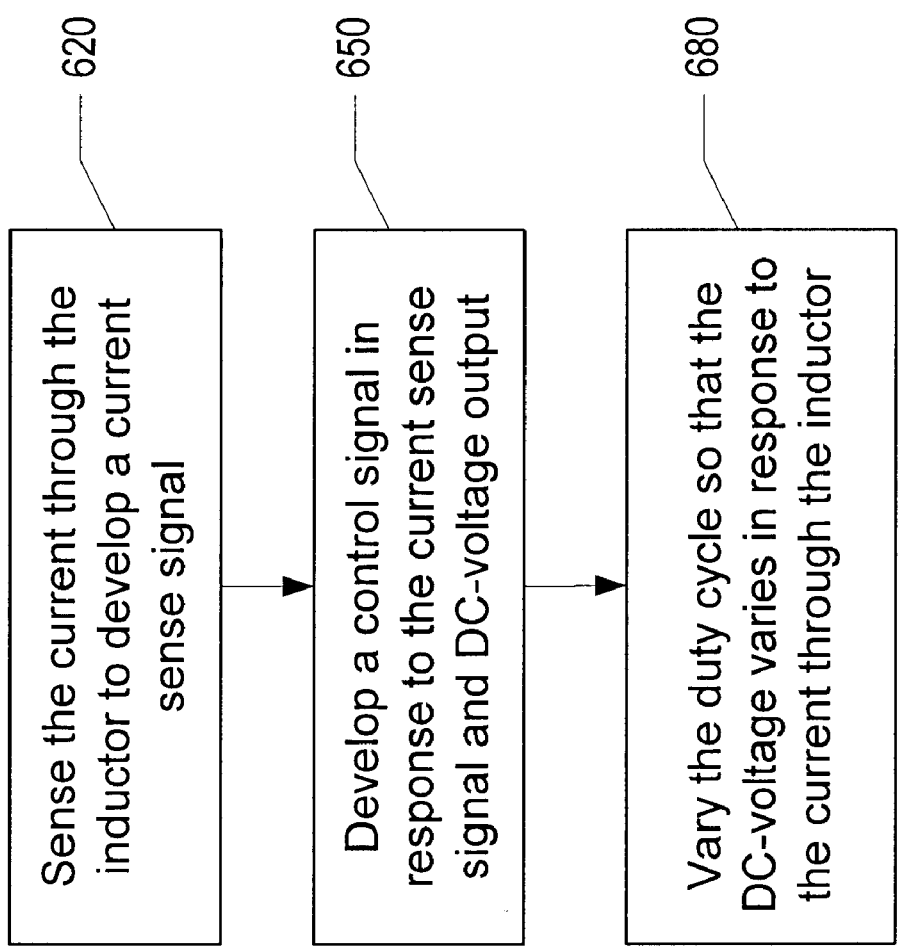

Referring to FIG. 6, another embodiment of a flow chart of a method of sensing current through an inductor of a DC-DC converter enabled to control an output voltage of the DC-DC converter is illustrated. The DC-DC converter circuit 200, illustrated in FIG. 2, includes an input node, e.g., the DC-voltage input node 210, an output node, e.g., DC-voltage output node 260 and an intermediate node 240. In step 620, a current flowing through an inductor 250 that is coupled between the intermediate node 240 and the output node 260 is sensed, so as to develop a current sense signal. In one embodiment, by linearizing the relationship between a voltage across an inductor, e.g., $V_L$ 275, and a current $I_L$ 252 through the inductor 250, the current flowing through the inductor is measured or sensed by measuring a voltage across the inductor.

In step 650, a control signal 229 is developed in response to the current sense signal $V_{Int}$ 280 and in response to the DC output voltage 272 at the output node 260. In step 680, a duty cycle of a voltage applied to the intermediate node 240 is varied so that the DC output voltage 272 varies in response to the current $I_L$ 252 flowing through the inductor. In one embodiment, the control signal 229 has an amplitude that varies substantially linearly in response to the current sense signal $V_{Int}$ 280.

A load line 330 or a load profile describes the relationship between a DC output voltage 272 and the current $I_L$ 252 flowing through an inductor. For example, in one embodiment, the DC output voltage varies, throughout a substantial portion of a range, in inverse linear proportion to the current flowing through the inductor.

The duty cycle of the voltage applied to the intermediate node, e.g., SW1 output 227, is varied by first applying a DC voltage to the input node, e.g., $V_{DC}$ 215. Then, by using the control signal 229 as an input to a switch SW1 225, coupled between the input node 210 and the intermediate node 240, to adjust the $T_{ON}$ time period.

Although the method and system of the present disclosure has been described in connection with the preferred embodiment, it is intended to cover such alternatives, modifications, and equivalents, as can be reasonably included within the spirit and scope of the disclosure as defined by the appended claims.

What is claimed is:

1. A computer system comprising:

a processor;

a memory coupled to the processor; and a power supply for providing power to the processor, wherein the power supply comprises a switching DC-DC converter circuit comprising:

a DC-voltage input;

a DC-voltage output that varies in response to a load current;

a switch comprising a switch input, a switch output and a control signal input, wherein the switch input is coupled to the DC-voltage input node and the switch output is coupled to an inductor, wherein the control signal determines duty cycle of a signal applied to the inductor, wherein the inductor is coupled between the switch output and the DC-voltage output;

a current sense circuit comprising a current sense input coupled to the inductor to detect a current through the inductor and a current sense output that varies substantially linearly with the current sense input; and a controller circuit comprising:

a first controller input coupled to the current sense output;

a second controller input coupled to the DC-voltage output; and at least one controller output for providing the control signal to the switch, wherein the control signal dynamically adjusts the DC-voltage output, in response to the current flowing through the inductor, whereby a change in current causes an opposite change in voltage.

2. A computer system as defined in claim 1, wherein the current sense circuit comprises:

an amplifier having a first input coupled to a first end of the inductor and a second input coupled to a second end of the inductor; and a feedback network coupled between an output of the amplifier and the first input of the amplifier, wherein the current sense circuit exhibits a transfer function having a zero attributable to inductor and a pole attributable to the feedback network.

3. A computer system as defined in claim 2, wherein the pole cancels the zero so that the output of the current sense circuit is a voltage that varies substantially linear with the current carried by the inductor.

4. A computer system as defined in claim 1, wherein the switch comprises:

a first switching element; and a second switching element, with the first switching element coupled between the DC-voltage input and the inductor and the second switching element coupled between the inductor and a reference potential.

5. A computer system as defined in claim 4, wherein the controller has a first output coupled to the first switch and a second output coupled to the second switch, the first and second controller outputs being complementary so that the inductor is alternately coupled to the DC-voltage input and to the reference potential.

6. A computer system in claim 5, wherein the current sense circuit comprises:

an amplifier having a first input coupled to a first end of the inductor and a second input coupled to a second end of the inductor; and a feedback network coupled between an output of the amplifier and the first input of the amplifier, wherein the current sense circuit exhibits a transfer function having a zero attributable to inductor and a pole attributable to the feedback network.

7. A computer system as defined in claim 6, wherein the pole cancels the zero so that the output of the current sense circuit is a voltage that varies substantially linearly with the current carried by the inductor.

* * * * *